United States Patent Office 3,292,959
Patented Dec. 20, 1966

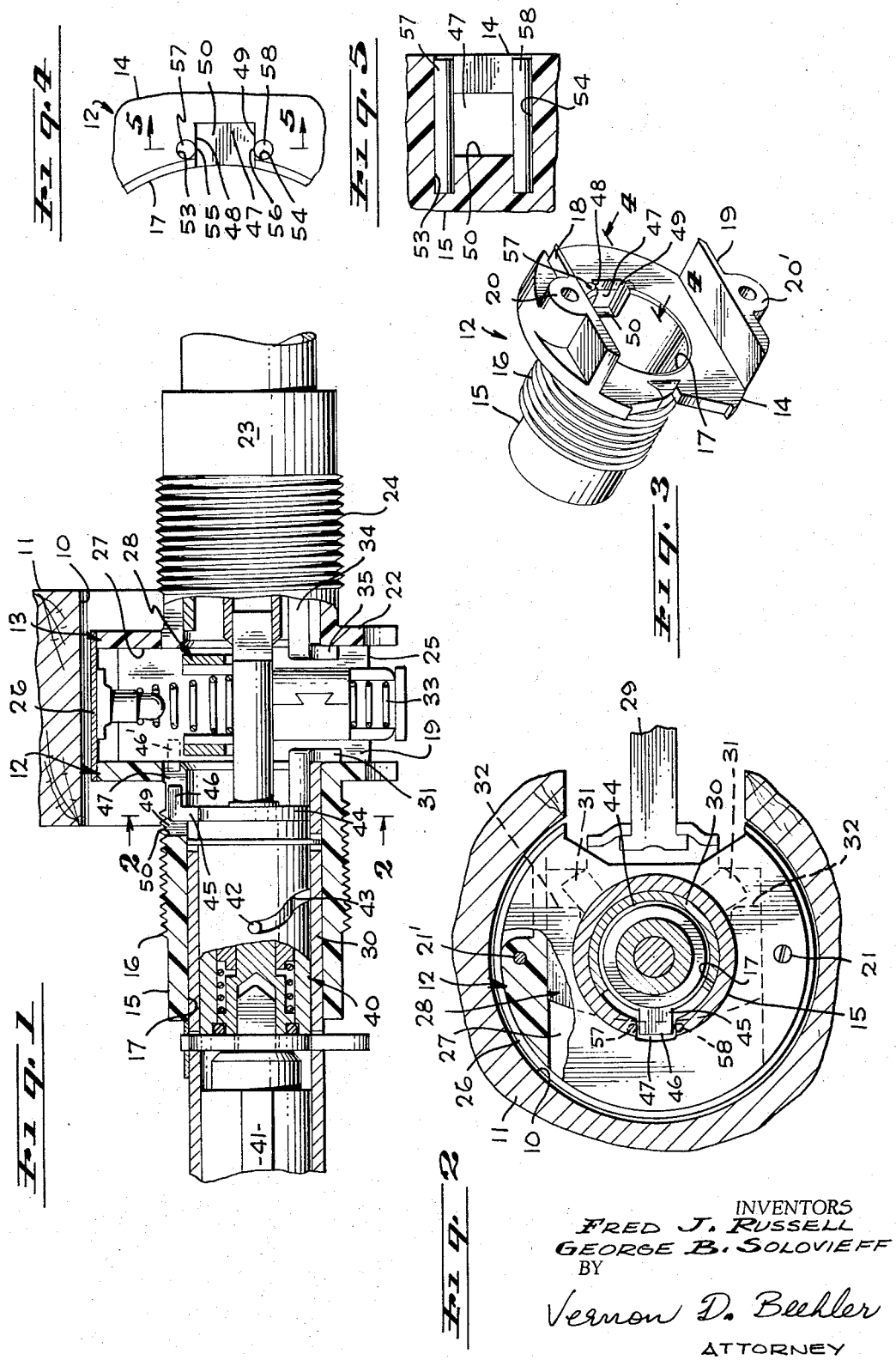

3,292,959
PLASTIC THREADED HUB WITH METAL INSERT
Fred J. Russell, 8635 Otis St., South Gate, Calif. 90280, and George B. Solovieff, San Clemente, Calif.; said Solovieff assignor to said Russell
Filed June 8, 1964, Ser. No. 373,429
3 Claims. (Cl. 292—1)

The invention relates to door locks and in particular a specific part of the internal mechanism of the lock at a location which experiences a considerable amount of wear.

The type of lock here under consideration is one wherein there is formed a frame having a chamber in which is located a retractor slide mounted in such a fashion that it reciprocates back and forth in order to withdraw, and, alternately, to permit the extending of a latch bolt. The reciprocation is accomplished by a rotating spindle which can be blocked from rotating and thereby lock the door under certain circumstances.

Heretofore, the frame and related parts, including a hub within which the spindle rotates, have been made of metal. More recently, with the improvement in certain of the synthetic plastic resin materials, some substitutions have been made, and synthetic plastic resin materials have been used in place of metal. Although such synthetic plastic resin materials have many desirable attributes, including durability, quiet operation, and low friction surface characteristics, where there is movement of one part upon another, they also have limitations. Among the limitations is the tendency of hard metal edges and corners, when moved in engagement with the synthetic plastic resin surface, to knife and gouge, as pressure is applied, into the complementary plastic moving part.

It is therefore among the objects of the invention to provide a new and improved lock device in which significant portions are constructed of synthetic plastic resin material but are strengthened and reinforced to resist wear.

Another object of the invention is to provide a new and improved lock device which makes use of synthetic plastic resin material for a part of the frame and spindle supporting hub wherein an opening adapted for cooperation with a mutually moving metal member is lined in a special fashion with a wear-resistant insert, thereby to protect the synthetic plastic resin material from undue wear and knifing action.

Still another object of the invention is to provide a new and improved lock device which makes use of a synthetic plastic resin material to form at least a part of the frame and the attached hub member wherein there is provided an opening in which a metal part is accommodated for various motions, including a sliding movement and pressure against an exposed portion of the opening, wherein metal inserts are adapted to constitute metal surfaces, so that the movement against still another metal part will be a metal-to-metal engagement, thereby to preserve the synthetic plastic resin material from failure under strong pressure and from knifing action.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:

FIGURE 1 is a longitudinal sectional view of a typical lock, showing the location and cooperative arrangement of the synthetic plastic resin portion of the structure.

FIGURE 2 is a cross-sectional view on the line 2—2 of FIGURE 1.

FIGURE 3 is an inner end perspective view of the synthetic plastic resin member.

FIGURE 4 is a fragmentary longitudinal sectional view on the line 4—4 of FIGURE 3.

FIGURE 5 is a fragmentary cross-sectional view on the line 5—5 of FIGURE 4.

For the purpose of illustrating the environment of the invention and to typify the advantages inherent in the structure, there has been chosen one of the current varieties of door locks shown mounted in an opening 10 in a door 11. For containing the mechanism, there is provided a frame which is made up of two parts, namely, a part 12 shown in perspective view in FIGURE 3 which cooperates with matching part 13. The parts 12 and 13 are shown in assembled relationship in FIGURE 1.

More specifically, the part 12 is made up of an end wall 14 from which extends a hub 15 provided over a portion of its length with threads 16. The hub 15 is tubular in form, providing a central passage 17. On the opposite side of the end wall 14 are parallel side walls 18 and 19, having bosses 20 and 20' respectively for the accommodation of bolts 21 and 21' by which the parts are held together.

The part 13 to this extent is of a comparable construction. For example, as visible in FIGURE 1, there is an end wall 22, and a hub 23 provided with threads 24 over a portion of the length. One side wall 25 of the part 13 is shown located opposite the side wall 19 of the part 12.

A housing 26 extends around the perimeter of the end walls 14 and 22, and housing 26, in company with the end walls 14 and 22 provides a chamber 27 which accommodates a retractor slide indicated generally by the reference character 28. The retractor slide 28 reciprocates from left to right and from right to left as viewed in FIGURE 2, the movement of which serves to manipulate an appropriate latch bolt (not shown) but which is attached to the retractor slide 28 by means of a tailpiece 29. For manipulating the retractor slide 28, a spindle 30 rotatably mounted in the central passage 17 is provided with rollbacks 31 adapted to cooperate with shoulders 32 on the retractor slide 28 in the customary fashion. The retractor slide 28, when retracted, is moved against the tension of a return spring 33, suitably mounted as shown, to return the retractor slide 28 after the spindle 30 has been released. A similar spindle 34, having rollbacks 35, is rotatably mounted within the hub 23 of the part 13.

The lock construction herein disclosed in one adapted to be locked by means of interposing a means for blocking retraction of the retractor slide 28 by spindle 30. This is accomplished by manipulation of a blocking assembly indicated generally by the reference character 40. Details of the structure and operation of the blocking assembly 40 have been disclosed in co-pending application Serial No. 104,657 filed April 21, 1961. By manipulation of a suitable key-actuated lock device indicated generally by reference character 41, mechanism of the blocking assembly 40, aided by a pin 42 sliding in a cam slot 43, serves to move a blocker 44 in a direction from left to right and from right to left as viewed in FIGURE 1. The blocker 44 is in the form of a metal blocking arm having an outer end 45 provided with a hook-like extension 46. When the extension 46 is moved from the solid line position of FIGURE 1 toward the right to the broken line position 46' of FIGURE 1, the extension 46 falls behind the innermost end of the retractor slide 28, thereby to prevent reciprocation of the retractor slide 28 inwardly.

To accommodate movement of the blocker 44 and its outer end 45 and extension 46, there is provided an opening 47 in the wall of the hub 15. The location of the opening 47, visible advantageously in FIGURE 3, shows the opening 47 extending through the end wall 14, so that it communicates with the chamber 27 formed within the housing 26 and side walls 18 and 19. The opening 47 has longitudinal walls 48 and 49 and a transverse end wall 50.

The parts 12 and 13 are made of an appropriate synthetic plastic resin. A material particularly advantageous has been found to be one commercially identified as Delrin. As a consequence, the wall of the hub 15 is relatively thick, as is also the end wall 14. This means further that the areas of the longitudinal walls 48 and 49 of the opening 47 present a considerable area. The extension 46 extends into the opening 47; and, in sliding from left to right and from right to left in the opening 47, the sides of the extension 46 tend to slidably engage the respective longitudinal walls 48 and 49 in the normal operation of the blocking assembly 40. It is also true that, during operation, as parts of the blocking assembly 40 are rotated, there is pressure exerted upon the blocker 44 and its extension 46 in a rotational direction, tending to force it against one horizontal wall or another, depending upon the direction of the rotation, as the extension 46 is moved in an axial direction. Since the blocker 44 is of metallic material and relatively hard, with relatively sharp edges as compared to the synthetic plastic resin material of the part 12, there is normally a tendency for the extension 46 to score the surfaces of the longitudinal walls 48 and 49.

To minimize scoring, wearing, or a knifing action such as might be otherwise experienced, the longitudinal walls 48 and 49 are specially reinforced. Reinforcement consists of providing in the material of part 12, by molding if preferred or by drilling, bores 53 and 54. The bores 53, 54 are of such diameter that, located as shown in FIGURE 4, a small portion 55 of the bore 53 breaks through the surface of the longitudinal wall 48. Similarly, a portion 56 of the bore 54 breaks through the surface of the longitudinal wall 49. A metal pin 57 is inserted into the bore 53, and a similar metal pin 58 is inserted into the bore 54. The connection between the respective metal pins 57, 58 and the bores 53, 54 is preferably a pressed fit, so that, once in position, the metal pins 57, 58 are firmly anchored in place. It is helpful also to have the length of the metal pins 57, 58 somewhat in excess of the length respectively of the longitudinal walls 48, 49 in order to make certain that the entire lengths of the longitudinal walls 48, 49 are protected by the presence of the metal pins 57, 58.

As a consequence, when the extension 46 of the blocker 44 moves as heretofore described within the opening 47, the sides of the extension 46 will engage exposed areas of the pins 57, 58 at the locations of the portions 55, 56 of the bores 53, 54 where they break through into the opening 47. The sliding contact of the extension 46 with the metal pins 57, 58 is continuous throughout the full extent of movement of the blocker 44 between the solid line unblocking position of FIGURE 1 and the broken line blocking position 46' of FIGURE 1. Accordingly, since this is a sliding metal-to-metal contact, the material of the extension 46 cannot score the plastic material of the longitudinal walls 48 and 49. Full advantage can therefore be taken of the characteristics of a synthetic plastic resin for the part 12, protected as it is by the metal pins 57 and 58.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A hub of synthetic plastic resin material having walls at its inner end forming a retractor housing, and a cylindrical hub section extending outwardly from said walls, said cylindrical hub section having a central passage in communication with the interior of said retractor housing, said hub having a longitudinally extending opening in a part of said cylindrical hub section adjacent said retractor housing and in communication with the interior of said retractor housing, longitudinally extending side walls for said opening, said hub having bores extending through the cylindrical hub section at a location immediately adjacent each longitudinally extending side wall of the opening, a longitudinal slit between each bore and the respective side wall having a width less than the diameter of the bore, and a metal pin having a fit in each said bore, each said pin having a location extending partly into the respective longitudinal slit, and a metal blocking arm having an end thereof extending into said opening between an outer released position and an inner position in blocking relationship with said retractor means.

2. A hub of synthetic plastic resin material having walls at its inner end forming a retractor housing, and a cylindrical hub section extending outwardly from said walls, said cylindrical hub section having a central passage in communication with the interior of said retractor housing, said hub having a longitudinally extending opening in a part of said cylindrical hub section adjacent said retractor housing and in communication with the interior of said retractor housing, said opening having opposite substantially parallel flat side walls, a metal blocking arm having an end with opposite substantially flat parallel sides extending into said opening, said blocking arm being movable in a circumferential direction against said side walls and being slidable longitudinally in said opening, said hub having bores extending from the retractor housing through the cylindrical hub section at a location immediately adjacent the opening and for a substantial portion of the axial length of said opening, a longitudinal slit in communication between each bore and the respective side wall, and metal pins fitting in each of said bores, said metal pins having portions of the respective circumferences extending through the respective slits into said opening and in sliding engagement with the respective side of the end of said blocking arm.

3. A door lock including a hub of synthetic plastic resin material having walls at its inner end forming a retractor housing, and a cylindrical hub section extending outwardly from said walls, said cylindrical hub section having a central passage in communication with the interior of said retractor housing, a retractor means including a retractor slide reciprocatably mounted in said retractor housing and a spindle rotatably mounted in said cylindrical hub section, said spindle having rollback means thereon in operating engagement with said retractor slide, said hub having a longitudinally extending opening in a part of said cylindrical hub section adjacent said retractor housing and comprising longitudinal side walls and an end wall, said opening being in communication with the interior of said retractor housing, and a blocking assembly including a metal blocking arm having an end thereof with opposite substantially flat parallel sides extending into said opening and reciprocatable longitudinally in said opening between an outer released position and an inner position in blocking relationship with said retractor means, said hub having bores extending from a location adjacent said inner end walls through said cylindrical hub section at a location immediately adjacent each longitudinal side wall of said opening and extending along the axial length of said opening intermediate opposite sides of the respective longitudinal side wall, and metal pins fitting in each of said bores, a longitudinal slit between each bore and the respective longitudinal side wall, said metal pins having portions of the respective circumferences extending through the longitudinal slits into said opening and in engagement with the end on the respective sides of said metal blocking arm.

References Cited by the Examiner

UNITED STATES PATENTS

| | | | |
|---|---|---|---|
| 2,222,491 | 11/1940 | Scribner | 308—239 |
| 3,073,640 | 1/1963 | McBurnie. | |
| 3,097,872 | 7/1963 | Russell | 292—169 |
| 3,112,944 | 12/1963 | Adler. | |
| 3,128,116 | 4/1964 | Patriquin et al. | |
| 3,161,449 | 12/1964 | Flom | 308—239 |
| 3,212,834 | 10/1965 | Mayer et al. | |
| 3,215,477 | 11/1965 | Arthur. | |

FOREIGN PATENTS 730,426   5/1955   Great Britain.

EDWARD C. ALLEN, *Primary Examiner.*

J. R. MOSES, *Assistant Examiner.*